(12) United States Patent
Petrie et al.

(10) Patent No.: US 7,143,134 B2
(45) Date of Patent: Nov. 28, 2006

(54) SYSTEM AND METHOD FOR INTEGRATING ELECTRONIC TRANSCRIPTION SYSTEMS

(75) Inventors: Joseph Petrie, Westwood, MA (US); Yonald Chery, Malden, MA (US); Matthew Gray, Somerville, MA (US); Christopher Cacioppo, Somerville, MA (US); Christopher Leonardo, Lexington, MA (US); Jeffrey Peden, Lexington, MA (US)

(73) Assignee: Virtual Ink Corporation, Cambridge, MA (US)

( * ) Notice: Subject to any disclaimer, the term of this patent is extended or adjusted under 35 U.S.C. 154(b) by 448 days.

(21) Appl. No.: 09/896,944

(22) Filed: Jun. 1, 2001

(65) Prior Publication Data

US 2002/0055788 A1    May 9, 2002

Related U.S. Application Data

(60) Provisional application No. 60/209,171, filed on Jun. 2, 2000.

(51) Int. Cl.
*G06F 13/00* (2006.01)

(52) U.S. Cl. .................. 709/204; 709/213; 709/217; 709/250

(58) Field of Classification Search ............... 709/203, 709/204, 205, 206, 213, 217, 219, 225, 238, 709/250
See application file for complete search history.

(56) References Cited

U.S. PATENT DOCUMENTS

| | | | | |
|---|---|---|---|---|
| 5,448,263 A | | 9/1995 | Martin .................. 345/173 |
| 5,793,365 A | | 8/1998 | Tang et al. ............... 345/329 |
| 5,875,436 A | * | 2/1999 | Kikinis .................... 705/34 |
| 5,878,186 A | * | 3/1999 | Bennett et al. ............. 386/85 |
| 5,916,302 A | | 6/1999 | Dunn et al. .............. 709/204 |
| 6,058,422 A | | 5/2000 | Ayanoglu et al. ......... 709/226 |
| 6,104,387 A | | 8/2000 | Chery et al. ............. 345/179 |
| 6,119,147 A | * | 9/2000 | Toomey et al. .......... 709/204 |
| 6,167,432 A | * | 12/2000 | Jiang .................... 709/204 |
| 6,175,822 B1 | * | 1/2001 | Jones .................... 704/270 |
| 6,388,654 B1 | * | 5/2002 | Platzker et al. .......... 345/156 |
| 6,412,011 B1 | * | 6/2002 | Agraharam et al. ...... 709/231 |
| 6,513,003 B1 | * | 1/2003 | Haque et al. ............ 704/235 |
| 6,789,228 B1 | * | 9/2004 | Merril et al. .......... 715/500.1 |
| 6,836,476 B1 | * | 12/2004 | Dunn et al. ............. 370/352 |

* cited by examiner

*Primary Examiner*—Viet D. Vu
(74) *Attorney, Agent, or Firm*—Kirkpatrick & Lockhart Nicholson Graham LLP

(57) ABSTRACT

The present invention provides a system and method for integrating one or more electronic transcription systems (12) having sessions providing data on a network (18) wherein real-time, two-way interactive access to the data by one or more remote users to the system is provided. In particular, the system and method provides one or more electronic transcription systems operably connected such that one or more users can access one or more of the electronic transcription systems. By networking the one or more electronic transcription systems and decoupling the processes of recording a particular transcription session, storing the data from the session on a network, and accessing the data, a wider range of control, access, and utilization of the electronic transcription systems can be accomplished.

45 Claims, 8 Drawing Sheets

SYSTEM AND METHOD FOR INTEGRATING ELECTRONIC TRANSCRIPTION SYSTEMS

CROSS-REFERENCE TO RELATED APPLICATIONS

This application is based upon Provisional Application Ser. No. 60/209,171 filed Jun. 2, 2000.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The invention is in the field of electronic transcription and, more particularly in the field of integrating one or more electronic transcription systems with a network.

(2) Description of Related Art

A variety of technologies have been developed for capturing and storing writing on a writing surface. These technologies include digitized writing surfaces (e.g., PALM PILOT, CROSS PAD, touch pads, digitizing tablets) which have mechanisms built into the writing surface to detect a position of a stylus, technologies which employ transmitters which transmit position signals to the stylus, and technologies which employ signal receivers which receive position signals transmitted from a stylus (e.g., MIMIO™).

Needs currently exist for integrating these technologies in the workplace and for facilitating remote learning and collaboration. Some of these needs are addressed by the present invention described herein.

SUMMARY OF THE INVENTION

The present invention provides a system and method for integrating one or more electronic transcription systems having sessions providing data on a network wherein real-time, two-way interactive access to the data by one or more remote users to the system is provided. In particular, the system and method provides one or more electronic transcription systems operably connected such that one or more users can access one or more of the electronic transcription systems. By networking the one or more electronic transcription systems and decoupling the processes of recording a particular transcription session, storing the data from the session on a network, and accessing the data, a wider range of control, access, and utilization of the electronic transcription systems can be accomplished.

Therefore, the present invention provides a system for integrating one or more electronic transcription systems having sessions providing data and a network, the system comprising (a) one or more network interface devices each operably connected to the electronic transcription system which is integrated into the network which registers the electronic transcription system with the network, wherein each device includes hardware that has a first connection to connect the network interface device to the electronic transcription system, a second connection to connect the device to the network, and software code to enable the network interface device to convert data from the session with the electronic transcription system into data suitable for transmission over the network; (b) one or more services selected from the group including a bartender service and a session service operably connected to the network; (c) one or more server systems, each server system operably connected to the network, wherein each of the server systems implements one or more of the services to enable access to the data from the one or more electronic transcription systems; and (d) a user computer operably connected to the network to enable a remote user access to the data from the session of the one or more electronic transcription systems connected to the network.

Preferably, the present invention provides the above system wherein the remote user to the one or more electronic transcription systems is provided real-time, two-way interactive access to the data from one or more sessions of the one or more electronic transcription systems connected to the network.

In a further embodiment of the system of the present invention, the bartender service manages interactions with each session in the system including providing a network connection between the network interface device and a session service for the session and participating in a discovery protocol to find the session service and register the device with the session service.

In a further embodiment of the system of the present invention, the session service acts as a router for other services in the system wherein the other services are able to discover and contact the session service and register itself as a source, a listener, or both.

In a further embodiment of the system of the present invention, an archive service is provided wherein the user uses the archive service to access an archive of data that has been stored on the network.

In a further embodiment of the system of the present invention, an archive service is provided which automatically stores data from the sessions.

In a further embodiment of the system of the present invention a meeting service is provided which enables users to access one or more sessions and to modify the data from the sessions over the network. In particular, an embodiment wherein a meeting service is provided which allows two or more remote users to communicate in real time using the network while viewing a session.

In a further embodiment of the system of the present invention, the service with a web user interface provides web-based access to the services.

In a further embodiment of the system of the present invention a print service is provided which enables the data of the session to be printed on a printer located on the network.

In a further embodiment of the system of the present invention the network interface device includes software which allows the network interface device to automatically obtain an IP address for the electronic transcription system from the server system.

In a further embodiment of the system of the present invention the network interface device includes software which allows the network interface device to receive the IP address from the user.

In a further embodiment of the system of the present invention the network interface device serves as a dynamic host configuration protocol (DHCP) server.

In a further embodiment of the system of the present invention, the network interface device is configured to operably connect with an electronic transcription system which is an active surface transcription system.

In a further embodiment of the system of the present invention, the network interface device is configured to operably connect with an electronic transcription system which is a passive surface transcription system.

In a further embodiment of the system of the present invention, there are at least two users using the meeting service, wherein the two or more users are able to access one of the sessions simultaneously and modify the data from the session.

In a further embodiment of the system of the present invention, the one or more of the server systems is located in the network interface device, located in the user computer or is located on a device that is not the network interface device or the user computer.

In a further embodiment of the system of the present invention, the connection of the network interface device to the network is wireless.

In a further embodiment of the system of the present invention, the connection of the network interface device to the electronic transcription system is wireless.

In a further embodiment of the system of the present invention, the network interface device includes configuration control software which is used to configure and control the server.

In a further embodiment of the system of the present invention, the network interface device is an integral part of the electronic transcription system.

The present invention also provides a method for integrating one or more electronic transcription systems having sessions providing data and a network comprising the steps of (a) providing one or more of network interface devices each operably connected to the electronic transcription system which is integrated into the network, which registers the electronic transcription system with the network, wherein each device includes hardware that has a first connection to connect the network interface device to the electronic transcription system, a second connection to connect the device to the network, and software code to enable the network interface device to convert data from the electronic transcription system into data suitable for transmission over the network; (b) providing one or more services selected from the group including a bartender service and a session service operably connected to the network; (c) providing one or more server systems, each server system operably connected to the network, wherein each of the server systems implements one or more services to enable access to the data from one or more electronic transcription system; (d) providing a user computer operably connected to the network to enable the remote user access to the data from the session of the one or more electronic transcription systems connected to the network; (e) connecting the electronic transcription system to the network interface device; (f) connecting the network interface device to the server, wherein the network interface device obtains an IP address for the electronic transcription device from the server; (g) beginning a session using the electronic transcription system, wherein the network interface device accesses a session service; (h) transferring data from the electronic transcription system through the network interface device to the server wherein the archive service automatically stores the data on the network; and (j) accessing the data from a remote location on the network.

Preferably, the present invention provides the above method wherein the remote user accesses the data in real-time from one or more sessions of the one or more electronic transcription systems connected to the network. It is further preferable that in the above method the remote user accesses the meeting service to obtain real-time interactive access to the data.

In a further embodiment of the method of the present invention, the network interface device accesses the bartender service which manages interactions with each session and provides a network connection between the network interface device and the session service for the session and participates in a discovery protocol to find the session service and register the electronic transcription service with the session service.

In a further embodiment of the method of the present invention, a user at the remote location accesses the session service to register itself as a source, a listener, or both and to access other services in the system.

In a further embodiment of the method of the present invention, the method further includes an archive service which a user at the remote location uses to provide the user access data from the sessions that has been stored on the network.

In a further embodiment of the method of the present invention, the method further includes an archive service which automatically stores data from the sessions.

In a further embodiment of the method of the present invention, the method further includes a meeting service which a user at the remote location uses to access one or more sessions and modify the data from the sessions over the network.

In a further embodiment of the method of the present invention, users at two or more remote locations use the meeting service to communicate in real time using the network while viewing a session.

In a further embodiment of the method of the present invention, the method further includes the service with a Web user interface which a user at the remote location uses for web-based access to the data stored on the network.

In a further embodiment of the method of the present invention, the method further includes a print service which a user at the electronic transcription system uses to print data of the session using a printer located on the network.

In a further embodiment of the method of the present invention, the network interface device is configured to operably connect with an electronic transcription system which is an active surface transcription system and wherein the network interface device converts data from the active surface transcription system for transfer to the network.

In a further embodiment of the method of the present invention, the network interface device is configured to operably connect with an electronic transcription system which is a passive surface transcription system and wherein the network interface device converts data from the passive surface transcription system for transfer to the network.

In a further embodiment of the method of the present invention, there are at least two users using the meeting service, wherein the two or more users access one of the sessions simultaneously and modify the data from the session.

In a further embodiment of the method of the present invention, the network interface device includes software which the network interface device uses to automatically obtain an IP address for the electronic transcription system from the server system.

In a further embodiment of the method of the present invention, wherein the network interface device includes software which the network interface device uses to receive the IP address from the user.

In a further embodiment of the method of the present invention, the network interface device acts as a dynamic host configuration protocol (DHCP) server.

In a further embodiment of the method of the present invention, the one or more of the server systems is located in the network interface device to provide the server systems, is located in the user computer to provide the server systems, or is located on a device that is not the network interface device or the user computer to provide the server systems.

In a further embodiment of the method of the present invention, the network interface device uses a wireless connection to the network.

In a further embodiment of the method of the present invention, the network interface device uses a wireless connection to the electronic transcription system.

In a further embodiment of the method of the present invention, the network interface device includes configuration control software which it uses to configure and control the server.

In a further embodiment of the method of the present invention, the network interface device acts an integral part of the electronic transcription system.

The present invention relates to devices, systems, software and methods for integrating one or more electronic transcription systems with a network.

In one embodiment, a network interface device is provided which is capable of operably connecting a receiver assembly of a transcription system to a computer network. The network interface device may also be used to operably connect other appliances to the network, such as various audio appliances.

The network interface device serves to convert timing data or stroke data from the receiver assembly of a transcription system, as well as data from other appliances into data suitable for transmission over the computer network. The network interface device also automates the configuration of how the receiver assembly and other appliances communicate with the network. For example, the network interface device may include logic for communicating the IP address for the receiver assembly and appliances to servers on the network such that it is unnecessary for the user to establish and configure that connection.

The network interface device may also include logic for managing server connections within the network. For example, the network interface device may select which server in a network to communicate with and may control switching to another server should a given server connection go down. In addition, the network interface device may itself include a server. As a result, the network interface device can act as a local server should other servers become unavailable. All of this management of server connections can be performed by logic resident in the network interface device independent of user involvement.

Another aspect of the present invention relates to networking a plurality of transcription devices together via a common network such that a plurality of users can access one or more of the plurality of transcription devices. By networking the plurality of transcription devices and decoupling the processes of (a) recording a given transcription session, (b) storing the information, and (c) reviewing transcription sessions, a wider range of control, access and utilization of transcription systems may be accomplished.

DESCRIPTION OF THE PREFERRED EMBODIMENTS

Figure 1:
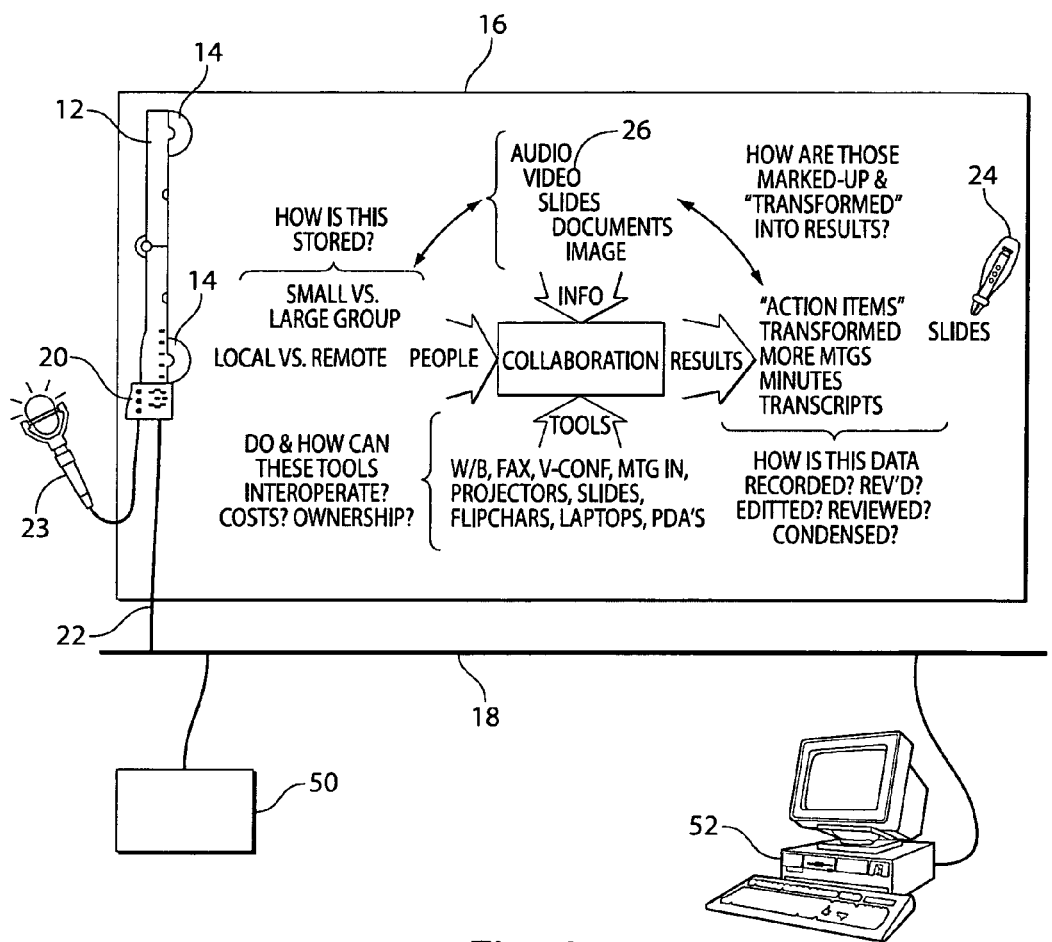
FIG. 1 illustrates a transcription system 12 connected to a computer via a network 18 where a network interface device 20 is used to connect the transcription system receiver assembly 12 to the network 18.

The present invention relates to devices, systems, software and methods for integrating one or more electronic transcription systems (ETS) 12 with a network 18. In one (1) aspect, the present invention relates to a network interface device 20 which automates the connection of an electronic transcription system 12 and other appliances to one or more servers 50 on a network 18. The present invention also relates to a network interface device 20 which may be used to directly connect an electronic transcription system 12 and other appliances to one (1) or more servers 50 on a network 18. Direct connection allows data generated by an electronic transcription system 12 during a session of use to be transferred to the network 18 for storage to memory and/or transmission to remote users 52 without requiring session data to be transferred to the network 18 via a local computer. As a result, the need to connect the transcription system 12 to a network 18 via a local computer (e.g., desktop, laptop, PDA, etc.) is eliminated. Any ETS 12 is considered to be in "session" when data produced by the ETS 12 is being transported to the network 18. A session is merely a time ordered collection of strokes, button presses and other actions. In one (1) embodiment using the MIMIO™, a session is started when the session start button on the MIMIO™ is pressed. A session may also be activated by a remote user through the meeting service.

The present invention also relates to a network interface device 20 that manages how an electronic transcription system 12 transfers data generated during a session to the network 18 via any one of a plurality of servers 50 so that the recordation and dissemination of data is not interrupted should a given server become unavailable.

The present invention relates to an electronic transcription system 12 operably connected to a network 18 via a network interface device 20 such that one or more users 52 remote from the electronic transcription system 12 can access data generated during a session of use of the electronic transcription system 12 from the network 18. Multiple users 52 may access the data as it is being generated, or subsequent to the data being generated. The users 52 may also participate in the session from the remote location. The user may add or modify the data as it is being generated or subsequent to the data being generated by the electronic transcription system 12.

The present invention also relates to a plurality of electronic transcription systems 12 networked together in a manner that allows one or more users 52 to participate in any one of a plurality of transcription sessions generated using the plurality of electronic transcription systems 12 where the user may select from among the plurality of transcription sessions. The plurality of users 52 may also access the plurality of transcription sessions using a single server or via any one of a plurality of servers 50 operably connected to the network 18.

The present invention allows one or more users 52 remote, relative to where a one or more plurality of electronic transcription systems 12 are being used, to select which session associated with a particular one of the plurality of electronic transcription systems 12 to monitor via the network 18. The present invention also allows users 52 to view other sessions stored to memory on the network 18 or to view an earlier portion of a session that is in progress. Multiple sessions may be reviewed by a given user simultaneously, even where one or all of these sessions are in progress.

The system 12 of the present invention preferably includes an electronic transcription system or assembly 12, a network interface device 20 and a network 18 including at least one (1) server and at least one (1) client, user or computer and a suite of services.

As used herein, an electronic transcription system or assembly 12 refers to any electronic transcription system 12 designed to record processable stroke data corresponding to writing. The transcription system 12 may further record writing color, writing pressure, writing angling, user identification, and may associate time, video and audio data in combination with the stroke data. Stroke data may be generated from writing which involves the delivery of media to a writing surface (e.g., ink, erasable ink, pencil, crayon, chalk, etc.) or may involve the electronic creation of writing. Electronic writing may be performed using a wide range of devices including stylus positioning systems, electronic touch-sensitive writing surfaces, digitizing tablets, monitor screens, LCD displays, mice, joysticks, trackballs.

One (1) type of transcription system that may be used with the present invention is a passive surface system which includes a stylus 24 which transmits signals that are received by one or more receivers (FIG. 1). The transcription system uses the signals received by the receivers to determine the position of the stylus 24 relative to a writing surface at multiple points in time. Alternatively, the transcription system may include a stylus 24 and one or more sensors that sense the position of the stylus 24 relative to the writing surface. Alternatively, the transcription system may include a stylus 24 which receives signals which are transmitted from one or more transmitters. In this instance, the system determines a position of the stylus 24 relative to the writing surface based on the signals sent from the transmitters to the stylus 24. The transcription system 12 may also include a stylus 24 which senses its movement relative to the writing surface without the aid of transmitters external to the stylus 24. In the cases where signals are transmitted between the stylus 24 and one or more receivers or transmitters, the signals may be electromagnetic signals (e.g., light, laser, electrical, radar), acoustic signals (e.g., ultrasound), resonant signals, or any combination thereof or any other form of signal which would enable a system to determine a position of a stylus 24 relative to a writing surface.

In one (1) particular variation, the transcription system 12 includes acoustic receivers which are mounted on a writing surface that receive ultrasound signals from a stylus 24. One (1) such transcription system 12 is MIMIO™ which allows writing surfaces to be retrofit to record written information. MIMIO™ includes signal receivers which are mounted on a writing surface. The signal receivers receive air-borne signals (for example ultrasound) which are transmitted by a stylus 24. The system 12 calculates the times of flight between the stylus 24 and the signal receivers in order to identify a position of the stylus 24 relative to the writing surface at different times. By repeatedly identifying the position of the stylus 24 relative to the writing surface, writing on the writing surface can be recorded. The design and operation of the MIMIO™ system is described in detail in PCT Application No. PCT/US99/09879, which is incorporated herein in its entirety by reference.

In one (1) embodiment, the transcription system 12 comprises: a stylus 24 which transmits position signals when positioned adjacent a writing surface; a plurality of signal receivers for positioning adjacent the writing surface which receive the position signals transmitted from the stylus 24 and produce timing signals in response; and a processing unit including logic for recording writing on the writing surface by determining the movement of the stylus 24 based on the position signals.

In another particular variation, the transcription system 12 is an active surface system which includes a digitized writing surface such as electronic whiteboards or SMART-BOARDS™ similar to those described in U.S. Pat. No. 5,448,263 which is incorporated by reference in its entirety. The digitized writing surfaces may be touch sensitive, or responsive to a light or laser pen wherein the whiteboard 14 includes a detector that detects the active signal.

As used herein, writing is intended to include the formation or modification of any type of image on a surface by a writing element, including printing, drawing, sketching, erasing and the like. The surface on which the writing is performed may be any surface on which writing may be performed. Examples of suitable surfaces include but are not limited to, whiteboards, blackboards, clipboards, desktops, walls, projection screens, flip chart tablets, and glass panes whether or not covered by a material such as paper, glass, metal, or plastic which can be written upon. The surface is preferably a relatively smooth and relatively flat surface, although it is noted that the surface may have a degree of curvature.

FIG. 1 illustrates one embodiment of the utilization of a network interface device 20 according to the present invention. FIG. 1 illustrates a transcription system receiver assembly 12 connected directly to a network 18 via a network interface device 20. As illustrated, a transcription system receiver assembly 12 including a plurality of receivers 14 is attached to a whiteboard 16 or other writing surface. The receiver assembly 12 is connected to a network 18 by the network interface device 20 operably connected to the receiver assembly 12. As illustrated, a stylus 24 may be used to write 26 on the whiteboard 16 where the stylus 24 transmits position signals to the receivers 14. The stylus 24 may thus be used to create data to be transmitted to the network 18.

The transcription system 12 may also include or have operably incorporated with it other appliances which gather information during a session of use or deliver information to the session. As illustrated by microphone 23, various other appliances may be operably connected to the network 18 via the network interface device 20. The microphone 23 may serve to send sound signals (e.g., voice) via the network 18 to adjacent the network interface device 20. The microphone 23 may also serve to record sound signals (e.g., voice) generated adjacent the network interface device 20. The transcription system 12 may further include a video camera (not shown) to record images during a session of use, a microphone (not shown) to record sound (e.g., voices), as well as other appliances for gathering information generated during a session of use. Audio appliances are particularly useful. Examples of audio applications that may be used with a transcription system 12 according to the present invention include audio recording, audio feedback to acknowledge user activity or system status, IP telephony, inter-office paging, audio archiving along with notes, etc.

In the preferred embodiment, the network interface device 20 allows for connection of the electronic transcription system 12 to a local network 18 such as an ethernet such that the data provided during a session by the electronic transcription system 12 can be stored on the server or can be, used, viewed or modified by a client of the network 18. The network interface 20 includes software for translating data from the transcription system 12 for transmission over the network 18. In one (1) embodiment, a RS-232 to TCP-IP translator is used in the network interface 20. The network interface device 20 preferably includes a housing within which is mounted a printed circuit board or card (not shown). The network interface device 20 is preferably powered by an external power source such as a 9V DC power supply (FIG. 1). Alternately, the network interface device 20 can include an internal power supply such as a battery. The network interface device 20 can also include a power switch (not shown), such as a toggle switch for turning the network interface device 20 on and/or off. The network interface device 20 can also be provided with an indicator to indicate whether the network interface device 20 is on or off. The indicator can be an LED. In the one (1) embodiment using the MIMIO™ transcription system 12, the card preferably provides a regulated 5V to power the MIMIO™. The printed circuit card has a network 18 connector for connection of the network interface device 20 to the network 18 and to allow for the transfer of data from the ETS 12 to the network 18. The network 18 connector is preferably a standard RJ-45 used for 10/100 BaseT. A network cable 22 serves to connect the network interface device 20 to the network 18. In an alternative embodiment, the connection between the network interface device 20 and the network 18 is a wireless connection. It is noted that the network interface device 20 may be compatible with wireless technology (e.g. IrDA, Bluetooth) such that it is possible to provide local transfer of data to and from the network 18 via the network interface device 20. For example, an information appliance (e.g. Palm Pilot) may be used to upload contact information onto the network 18 via an IR interface to the network interface device 20. Meanwhile, the network interface device 20 may also be used to transfer data locally from the network 18 onto an information appliance. This may be done in a wired or wireless manner. In the particular embodiment using the MIMIO™ as the transcription system 12, the printed circuit card also preferably has a female DB9 connector which allows the MIMIO™ to be connected to the network interface device 20 by a serial cable and to allow transfer of data from the MIMIO™ to the network interface device 20 and to the network 18. In an alternate embodiment, the connection between the network interface device 20 and the ETS 12 is a wireless connection. In the preferred embodiment, the connection for the transcription system 12 is located at one (1) end of the network interface device 20 and the connector for the network 18 is located at the opposite end of the housing. However, it is understood that the network interface device 20 can have any shape or size. The network 18 connector also preferably has two (2) green LEDS to indicate the network 18 link and for indicating network 18 activity. Preferably, the LEDS are an integral part of the RJ-45 connector.

In one (1) embodiment, the network interface device 20 includes a speaker. Since the network interface device 20 eliminates the local computer, a replacement for the audio feedback provided to the user at or near the ETS 12 is considered very desirable. The speaker located in the network interface device 20 combined with a codec and amplifier located in the network interface device 20 provides this feedback. In the preferred embodiment, the server sends G.711 compliant audio packets to the network interface device 20 adapter. The network interface device 20 forwards the data to the codec. Sufficient buffering is provided to allow up to three (3) seconds of audio playback per message. A stored audio message will be played from the network interface device 20 indicating that the server has been lost. In the embodiment using the MIMIO™, a stored audio message will be played if pen-up, and/or pen-down packets are detected, and there is no connection to the server. Preferably, these messages will be played every three (3) seconds when there is pen activity. The user will have to power down the MIMIO, or remove the connection to the network interface device 20 to eliminate the messages. A pen-down packet causes the light to turn on. A pen-up packet causes the light to turn off. Volume buttons can be provided on the network interface device 20 to control the volume of the speaker. The volume buttons are preferably elastomeric combined to a single rocker-type button to activate the increase or decrease in volume. The volume buttons utilize the programmable gain function available in the codec. Each new button push increases/decreases the gain of the codec playback by one count. The G.711 specification requires an 8-bit uLaw or Alaw companding, at a fixed 8 kHz sampling rate, and defines the serial transmission as sign bit first, and least significant bit last (Big Endian). It also defines a relationship between the encoding laws and the audio level in dBmO. In the one (1) embodiment, the network interface device 20 will be able to download code from the server. This will allow for storing new audio files and error messages. The network interface device 20 can also include a feedback indicator to indicate whether or not or how the user is using the electronic transcription system 12. The indicator can be provided as part of the printed circuit card.

The network interface device 20 includes embedded software or logic which controls the indicators of the network interface device 20. The network 18 activity indicators are controlled directly by the network interface device 20. In the one (1) embodiment, using the MIMIO as the transcription system 12, the state of the dual color MIMIO indicator located on the MIMIO capture bare is controlled by the network interface device 20. The network interface device 20 controls the indicators by sending the approximate serial command to the MIMIO. Further, in this embodiment, the pen activity indicator is functionally connected to an I/O pin on the network 18 processor. The state of the pen activity indicator is controlled by the interpreting pen-down and pen-up serial packets.

In the embodiment using the MIMIO™, the indicator located on the MIMIO™ is interpreted with the following states: blinking yellow=no server, or no IP address; solid yellow=server; and green=ready to write. The light states are controlled by the network interface device 20 sending the appropriate serial command packets to the MIMIO. If the network interface device 20 does not have an IP address assigned, or if the network interface device 20 can not locate a server, the network interface device 20 sends an "LED error on" serial packet to the MIMIO. The green light on the MIMIO is created by sending poke serial packets to the MIMIO. One poke packet is required every five (5) seconds to keep the light green. Lack of poke packets will cause the MIMIO indicator to return to its default solid yellow state. Poke packets from the server are used to verify the response of the server to a MIMIO™. Initialization packets from the MIMIO are used to verify the presence of a MIMIO to a server (or to notify the server of a new MIMIO).

The network interface device 20 can also be provided with meeting/session control buttons. Preferably, there are three (3) buttons. The start session button indicates to the server the start of a session. The end session button indicates to the server the end of the session. The information button requests feedback from the server. Some of the feedback which can be requested is to repeat the last audio message played, or to indicate details about the current session.

The network interface device 20 may include software which allows the device to configure itself to serve as a server or configure a local computer to act as a server. In this regard, it is noted that the network interface device 20 may be simultaneously connected to both the network 18 via the network cable 22 and to a local computer (not shown in FIG. 1). Thus, if the network interface device 20 determines that no server is available, the network interface device 20 software either implements itself or a local computer to act as a server. This insures that transmission of data to clients remote to the transcription device via the network 18 is maintained.

Optionally, the network interface device 20 may include memory which enables it to store data generated by the electronic transcription system 12. The memory incorporated into the network interface device 20 may be sufficient to only store a limited amount of data and thus serve as temporary storage. Alternatively, a greater amount of memory may be incorporated into the network interface device 20 in order to allow greater amounts of data to be stored locally prior to being stored remote from the transcription system 12. By having memory capacity, the network interface device 20 can be used to host web pages (such as portions of a transcription session).

It is noted that the network interface software may automate the process of connecting a transcription system 12 to the network 18. For example, the network interface software may automate the process of identifying an IP address for the transcription system 12 and logging the transcription system 12 onto that IP address. As a result, the user is able to simply plug the transcription system 12 into the network 18 via the network interface device 20 without having to further configure the transcription system 12 for use on the network 18.

The network interface device 20 preferably includes software or logic which enables the network interface device 20 to act as a Dynamic Host Configured Protocol server (DHCP) if the network 18 to which the network interface device 20 is connected does not have a DHCP server. If the network 18 includes a DHCP server, then preferably the network DHCP server is used to automatically assign the IP address to the ETS 12. The network interface device 20 also sends broadcast packets to the server or servers 50 and listens for solicitation responses from the server or servers 50. In the preferred embodiment, the network interface device 20 transmits a broadcast UDP solicitation on a port. Preferably, the packet contains a single byte and a version number. The network interface device 20 preferably sends this solicitation approximately every three (3) seconds. The response in the preferred embodiment is a unicast UDP packet of five (5) or more bytes. Preferably, the format is a single byte indicating the number of servers 50, followed by a list of IP address (4 bytes)/port number (2 byte, big endian) pairs. In the preferred embodiment, approximately five (5) seconds after the first response is received from the server, the network device 20 takes all lists and randomly selects one (1) IP/port pair that appears on all of the lists. The network interface device 20 then opens a TCP connection to the selected IP/port and engages in all communication over this socket. If there are no IP/port pairs that appears on all of the lists, the network interface device 20 will indicate an error and the connection will fail. After failure, the network interface device 20 maintains a listening UDP socket on a port. If the network interface device 20 receives a broadcast message on this port, the network interface device 20 retransmits a broadcast solicitation and reengages in the protocol selection. If the currently selected IP/port is still a valid selection, that port will remain in use. Otherwise, the network interface device 20 closes the existing connection and either connects to a new valid server or indicates an error and the connection fails.

Once a network 18 translator in the network interface device 20 has converted data from the transcription system 12, the data may be transmitted to the network 18 so that users 52 may access the data from the network 18. The network interface device 20 may transmit raw or processed data from the transcription system 12 to one or more servers 50 on the network 18. Varying amounts of logic associated with the transcription system 12 for processing the stroke data may reside outside of the network 18 or reside on a server within the network 18. For example, the electronic transcription assembly 12 or the network interface device 20 may not include logic for processing data corresponding to the receipt of position signals by the signal receivers. Alternatively, the electronic transcription assembly 12 and/or the network interface device 20 may include logic for processing data corresponding to the receipt of position signals into timing signals and optionally into stroke data.

It is noted that utilization of a network access device allows a portion of the operation of the transcription system 12 be performed as an application service provider ASP. For example, the operating system for the transcription system 12 including logic for converting timing data into stroke data and for converting stroke data into images can all be stored on a server on the network 18. This allows the receiver assembly 12 to become a dumb device. The advantages of transmitting the data retrieved from the electronic transcription assembly 12 directly onto a server on the network 18 as opposed to a local computer will become more apparent in the next section discussing the advantages of utilizing networked transcription systems.

Figure 2:
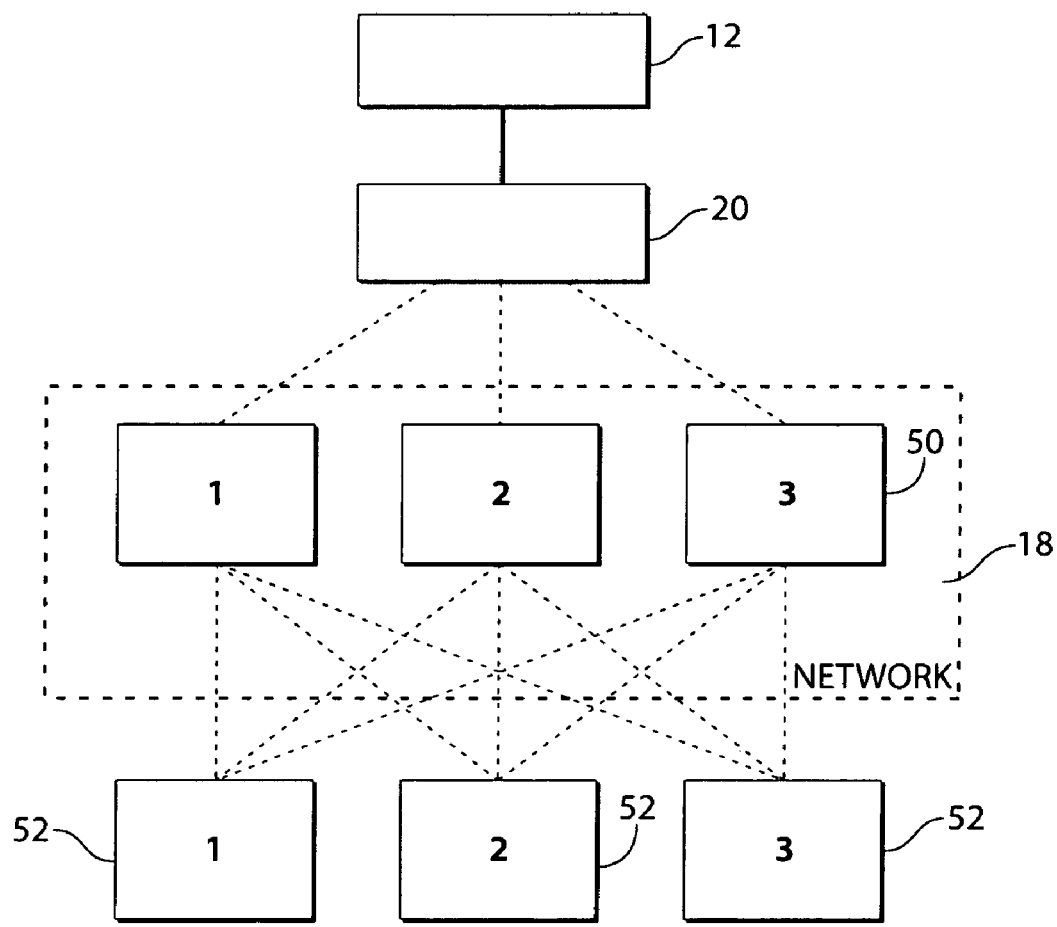
FIG. 2 illustrates a transcription system 12 connected to a network 18 via a network interface device 20 where the network interface device 20 manages connections between the transcription system 12 and multiple different servers 50 within the network 18.
Figure 3:
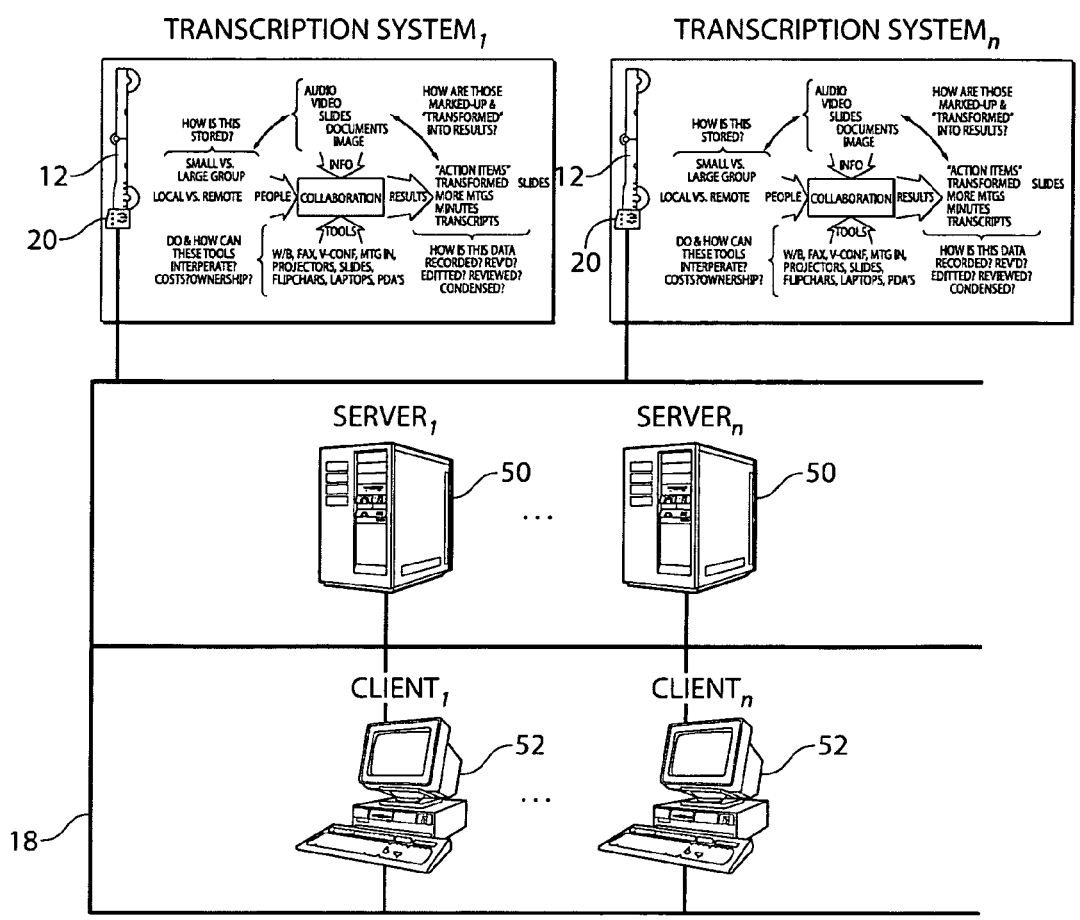
FIG. 3 illustrates a plurality of transcription systems 12 and a plurality of clients in communication with each other via a network 18 which may include a plurality of servers 50.
Figure 4:
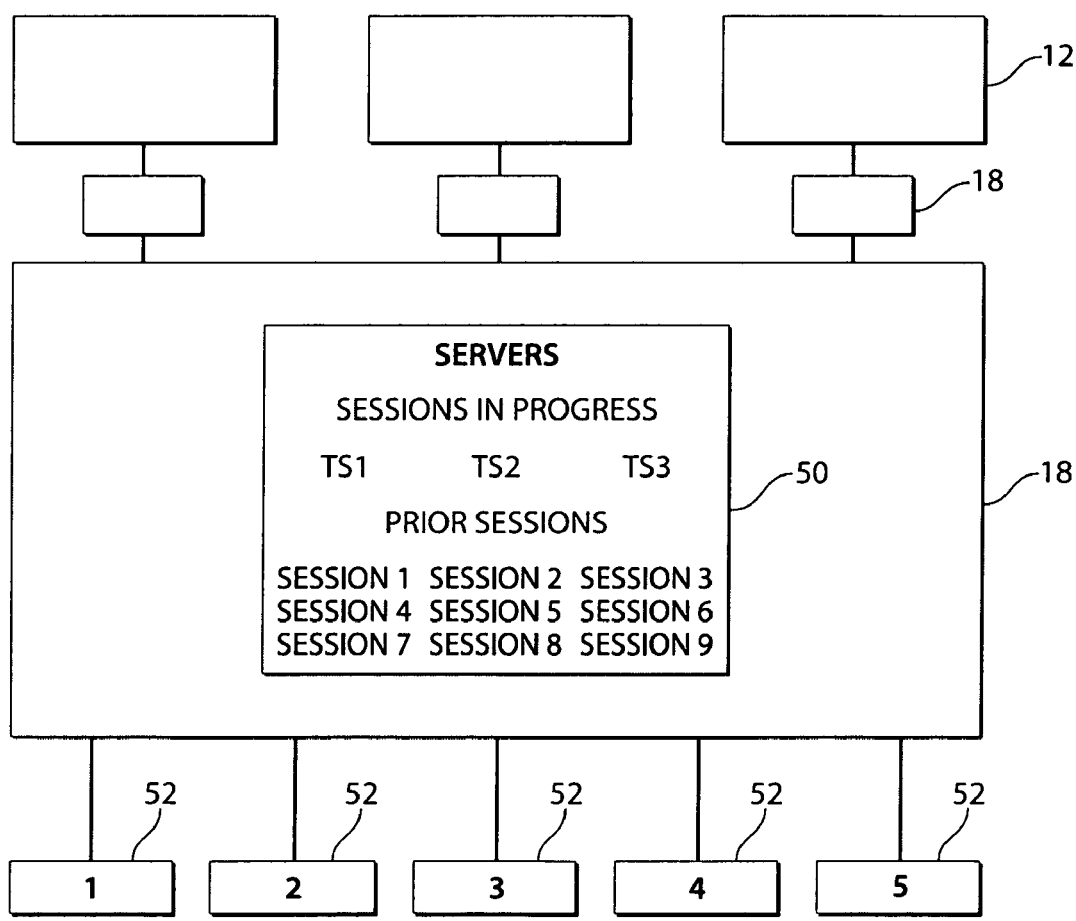
FIG. 4 illustrates a plurality of transcription systems 12 located remote from each other connected to a common network 18 where a plurality of users 52 can select from among sessions ongoing with the plurality of transcription systems 12 as well as sessions in memory.

FIGS. 2 to 4 illustrate networking one or more transcription systems 12 and the advantages which that provides. FIG. 2 illustrates a transcription system 12 connected to one or more of a plurality of servers 50 within the network 18. The network interface device 20 may also include functionality which allows it to function as a server. Operably connected to the network interface device 20 is computer executable logic which the network interface device 20 uses to search for an available server (illustrated as the selection of one of the dotted lines). Should a server go down while a transcription session is in progress, the computer executable logic functions to locate another server and continue the session.

In operation, selection of a server and switching between servers 50 is invisible to the user. For example, should a primary server go offline during a session, once the primary server comes back online, any information recorded on different servers 50 involved in a transcription session are married together by server software into a seamless stream of information.

The present invention allows any device which is capable of operating as a server to access data generated by a transcription system 12. Different mechanisms for communicating with devices that can act as a server may be employed, both via a wired and wireless connection. Using protocol X, the transcription system 12 may also locate devices seeking to obtain data to display or transmit information.

The various servers 50 which may communicate with the network interface 20 may do so via a number of different communication protocols including: master/slave, peer/peer. The particular relationship is not critical to the operation of the present invention. Rather, the present invention takes advantage of a distributed system design in which the network interface software searches for and locates one or more available servers 50.

Information relating to an electronic transcription system session may be displayed using a graphical display both local to the electronic transcription system 12 and remote relative to the electronic transcription system 12. For example, it may be desirable for data to be transmitted to a device local to the transcription system 12 and displayed. This may be a monitor operably connected to the electronic transcription system 12. Optionally, the network interface device 20 may include a display, such as an LCD panel or similar device (not shown).

Software utilized in the present invention allows users 52 remote to the transcription system 12 to access data from a session over the network 18 and display that data. The display used may be a monitor operably connected to the network 18, either directly or via a local computer.

FIG. 3 illustrates a plurality of transcription systems 12 and a plurality of clients or users 52 in communication with each other via a network 18 which may include a plurality of servers 50. As illustrated, the present invention also relates to a series of transcription systems 12 networked together such that any user is able to select any transcription session, whether in process or in memory, regardless of how the transcription system 12 is connected to the network 18 (e.g., which server the transcription system is connected to) and regardless of how the client or user is connected to the network 18 (e.g., which server the client is connected to). The ramification of this will now be further explained in regard to FIGS. 4 and 5.

FIG. 4 illustrates a plurality of transcription systems 12 located remote from each other connected to a common network 18 where a plurality of users 52 can access the sessions ongoing with the plurality of transcription systems 12 as well as sessions in memory (archive). The present invention thus allows a user to select any session regardless of who else is viewing the session, or whether the session is recording or already recorded. This also allows a user to review a session that is in process, and simultaneously (e.g., in a separate window) review an earlier portion of the same session. Alternatively, a user may view two different sessions at the same time, regardless of whether one or both of them are in progress.

FIG. 4 further illustrates that a plurality of users 52 can simultaneously access the same session, whether the session is in progress or has been prerecorded. Each user may be provided with a menu of available sessions to review. As illustrated, these sessions may optionally be divided into sessions that have already been recorded and sessions in progress. Users 52 can thus access any session without interfering with another user's ability to review any of the sessions in the menu.

By allowing a plurality of users 52 to observe a transcription system 12 session at the same time, the present invention enables centralized control across the network 18 of the work and viewing environments of clients reviewing a session, whether viewed in progress or in a recorded version. Various actions can thus be caused to occur at multiple different locations connected to the network 18 from a single location. It is noted that the control may be performed by commands originating at the transcription system 12, commands recorded after completion of a session by an individual, and/or by commands originating by a person reviewing a session together (live or recorded). Thus, a person reviewing a session can modify the data produced during the session. Preferably, a user can not modify past sessions and save the data without retaining the original unmodified data.

As another example, one might also cause computers to adopt a particular configuration (e.g., color display, volume, etc.) at the initiation of a live or prerecorded session. The centralized instruction may be limited to sessions in progress or may be recorded into memory and incorporated into recorded sessions as well.

Centralized control over a group of clients and/or the transcription system 12 can include control over functions that are not directly related to the transcription system 12. For example, the user of the transcription system 12 can turn all phones of the clients on "do not disturb", can modify the room lighting, sound volume, contrast, Public Address (PA) System, and other such functions for all or some of the clients. This control can be further extended to clients observing recorded sessions.

As another example, the person operating the transcription system 12 may also cause a voice intercom message or email message to be transmitted to all of the clients over the network 18 via a microphone connected to the transcription system 12. Similarly, one of the clients observing a session can transmit a voice intercom message or email message to the transcription system 12 and the various clients observing the session. Optionally, that message can also be saved to memory so it can be retrieved by others who review a recorded version of the session.

Figure 5:
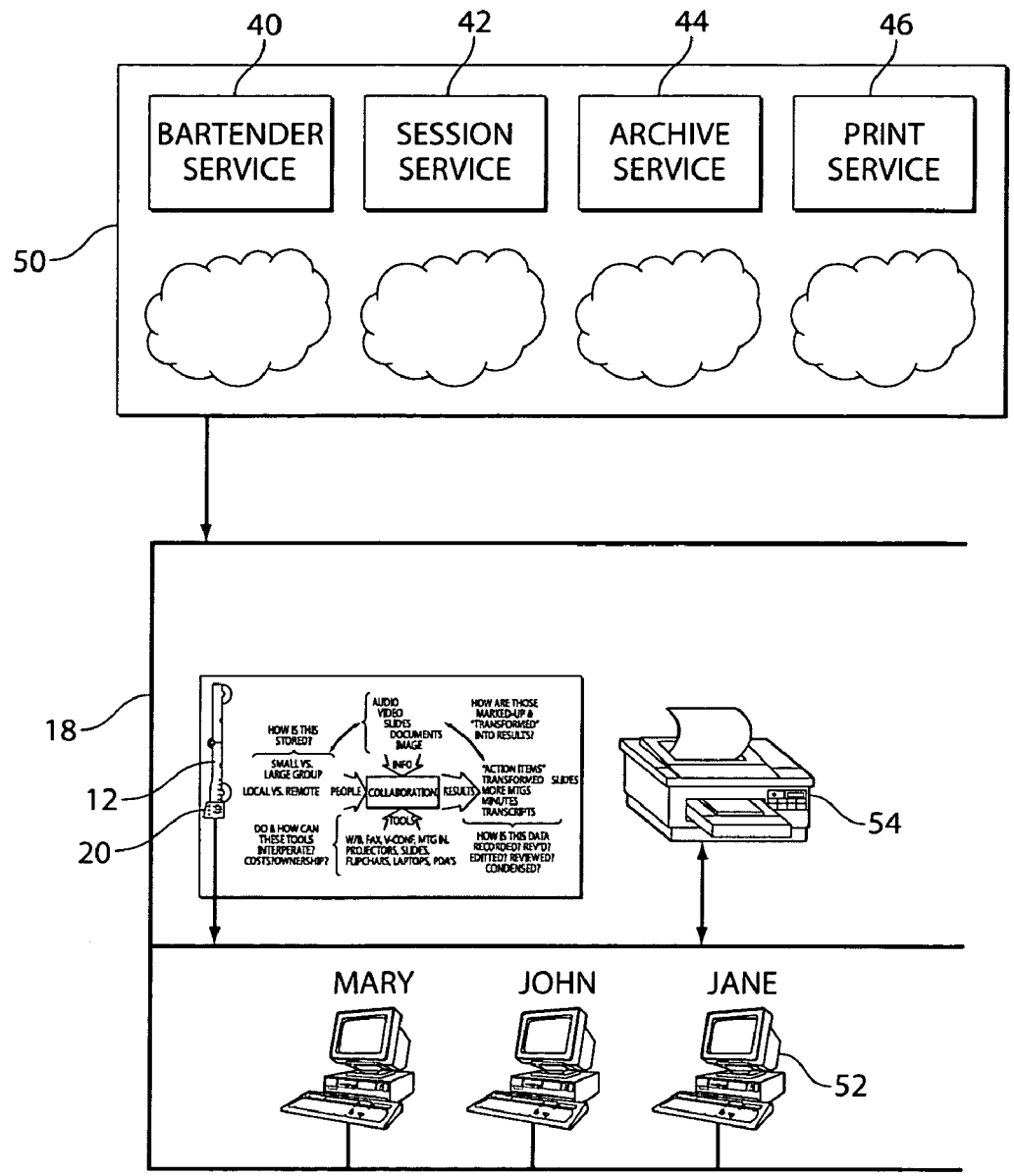
FIG. 5 provides a flow diagram for a transcription session between a user employing a transcription system 12 and a plurality of clients remote from the transcription system 12 where the plurality of clients access the session with their own personalized configuration via the network 18.
Figure 6:
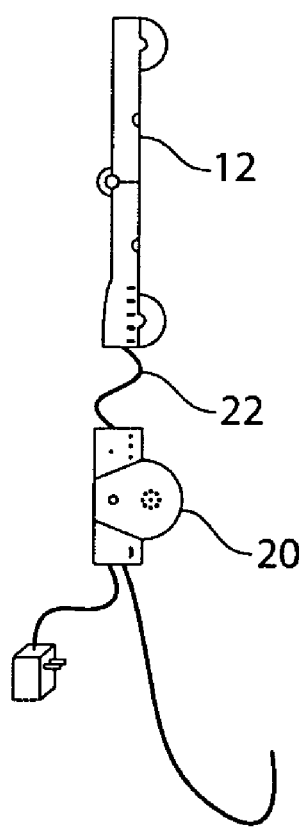
FIG. 6 is a schematic view of the electronic transcription system (ETS) 12 with the network interface device 20 showing the cable 22 connected between the ETS 12 and the network interface device 20.

FIG. 5 provides a flow diagram for a transcription session between a user employing a transcription system 12 and a plurality of clients or users 52 remote from the transcription system 12 where the plurality of clients or users 52 access the session with their own personalized configuration via the network 18.

As illustrated in FIG. 5, Network Interface Service 40 refers to the process described in greater detail in relation to FIG. 1 whereby the primary user's (Bob's) transcription system 12 is connected to the network 18 via a network interface device 20. By connecting the transcription system 12 to a network interface device 20 and the network interface device 20 to the network 18, the network interface device 20 automates the assignment of an IP address for the transcription system 12.

As can be seen from FIGS. 2 to 5, by having the processes of (a) recording data relating to one or more transcription system sessions (and other related data); (b) maintaining the data on the network; and (c) supporting user access to the data all be performed over a network, these various processes are entirely decoupled. This allows for greater diversity with regard to how a plurality of users 52 might interact with each other and various transcription sessions that are being performed or in memory.

Sending all of the MIMIO'S initialization packets to the server would cause an unnecessary amount of traffic on the network 18. Likewise having the server send poke packets to the MIMIO every five (5) seconds is also unnecessarily taxing. Therefore, programmable "delay constants" N, and P are used to reduce network traffic. One constant causes only a limited number of initialization packets (preferably every Nth packet) to be forwarded to the server. Receiving a poke packet from the server causes a predetermined number of additional pokes P to be sent directly to the MIMIO from the network interface device 20. These values are programmable from the server, and can be adjusted based on network conditions. These constants are set to immediately overflow on power-up. The reason for this is to minimize delay in discovering the bar, the server, and turning the light green.

EXAMPLE 1

In all of the following cases the value of N will be 7, and the value of P will be 15 and the electronic transcription system 12 is the MIMIO™.

In the condition where both the server and the MIMIO are working the following scenario will result. Starting from the time that a poke packet is sent from the server.

The network interface device 20 will reset its Poke counter to zero and will reset its Initialize counter to zero. The network interface device 20 will then send a serial poke packet to the MIMIO™. The network interface device 20 will increment its Poke and Initialize counters. The network interface device 20 continues sending poke packets to the MIMIO™ and increments its counters until either N or P overflows. When N overflows an initialization packet will be forwarded from the network interface device 20 to the server via TCP/IP. If a poke packet is received from the server, the scenario resets and the counters are reset. When (if) P overflows it means that a poke has not been received from the server. If the P overflows, the network interface device 20 will no longer send serial poke packets to the MIMIO™, and the MIMIO™ indicator will change to its default state (yellow). The scenario will reset when a poke packet is received from the server.

If the ETS 12 disappears the following scenario will result. The following scenario is presented from the server's viewpoint. In this portion of the example, the server has set its "bar timeout" to 90 seconds. Initially, both the server and ETS 12 are works with the server receiving initialization packets from the ETS 12 to the network interface device 20 every 35 seconds and responding by sending a poke packet via TCP/IP through the network interface device 20 to the ETS 12. If the server has not received an initialization packet in its timeout period (90 seconds), the server assumes the ETS 12 has been powered down, or disconnected, and removes that session from its list.

If the server disappears, the following scenario will result. The following scenario is presented from ETS 12 viewpoint. Initially, the ETS 12 sends initialization packets, and receives poke packets from the server in response every 35 seconds. The ETS 12 initialization counter N overflows and the ETS 12 sends another initialization packet to the server. However, the ETS 12 does not receive a poke packet via TCP/IP from the server. The ETS 12 continues sending initialization packets until the ETS 12 poke counter P overflows. The network interface device 20 will no longer send poke packets to the ETS 12, and the ETS 12 indicator will indicate loss of server and turn yellow.

The present invention uses the JINI architecture. At the core of the JINI architecture is the notion of services and clients. A service is a software component residing somewhere on the network 18 capable of providing some service ranging from pure software services to hardware access services. A service represents a specific part of the functionality of the whole system. These services are distinct programs designed to register themselves within a lookup service on the network 18. Services may be hidden from the end-user and communicate only with themselves, or register a graphical user interface which the client can then download to allow the user to interact directly with the service. It is important to note that while most installations will have all of the services residing on the same host machine, it is possible that these services be distributed and even replicated over many separate machines. A client is any piece of software that accesses these services. Most services will also be clients (that is, utilize other services), however, services are not necessarily clients. Further, a service is not equivalent to a server. A single server may run multiple services. The clients may automatically locate services that suit their needs and will download code fragments that implement whatever protocol is necessary to communicate with that service. This allows a service implementation, including protocol changes to occur transparently to all other services and clients in the system. The particular way this is accomplished is through a four architectural aspects of the system: Discovery, Lookup, Remote Stubs and Leasing.

Discovery is the mechanism by which services discover a lookup server that they register with and how clients discover a lookup service that they utilize to add other services. By using the Discovery Protocol, these services will locate each other running on the network 18, and self configure forming a federation. There are two forms of discovery: multicast and unicast. Multicast discovery is used to discover previously unknown nearby lookup services. This may cause only services on the local subnet to be discoverable, or if multicast routing is enabled, services on an entire intranet. Unicast discovery is used to discover a well-known lookup server, possibly local and possibly distant.

The lookup service is how clients on a network 18 locate services. These services may include other lookup services. This allows a minimalist lookup server to be run on a network 18 and its only entry to be another lookup server elsewhere on the network 18, perhaps out of multicast range. The JINI lookup service keeps track of all services that have joined a JINI community. Each service uses the lookup service to store their remote stubs and provide attributes to describe these stubs. Client software also uses the lookup service to search for services and to be notified when new services become available. Once a client locates a lookup service via discovery, the client may query the lookup service for interesting services, based on the services interfaces and other attributes. Once the client has identified a service it is interested in, the client can download a Remote Stub to use to interact with the service.

Remote Stubs are pieces of mobile code that are retrieved from the lookup server. These stubs present a programmatic interface to the client and allow it to communicate with the service without needing to know the location of the service or the protocol required to communicate with it. In fact, when the initial lookup discovery process occurs, a stub for communication with the lookup service is delivered to the discovering party, and it is used for all communications to the lookup service, allowing that protocol to change as needed.

Leasing is the mechanism that helps services adjust to failures and other reliability problems. All interactions between services and clients may have an associated "lease" on that interaction which must be renewed. This requirement of leases provides a convenient paradigm for programming in a potentially unreliable network environment, as well as providing a simple mechanism for adapting to failure where the components may not be capable of notifying one another if they fail.

The services of the present invention are a set of Jini-enabled programs which implement a variety of services that are used by the client or user, or by each other, in a network environment. The present invention has a set of services including a bartender service, a session service, an archive service, a meeting service and a print service.

The bartender service provides a network transport between the ETS 12 or network interface device 20 and the session service. The bartender service preferably has only one (1) interaction and that is with a session service. The bartender service participates in the discovery protocol to find and register with the session service. The bartender preferably resides on the server. Once the bartender service has selected a session service, the bartender service has no further communication with any other services other than the session service and the ETS 12. Alternatively, the bartender service could reside on the network interface device 20. The bartender service is a simple Jini service, which manages all interaction with the network interface device 20.

The session service 42 allows multiple secondary users 52 (Mary, Jane, and John) to join a session with a primary user (Bob) and his electronic transcription system 12 over the network 18. The primary user's transcription system 12 and its IP address appear in a window or user interface and are selectable by multiple secondary users 52.

The network interface device 20 for the primary transcription system 12 may be configured to control certain functions via the network 18 for the secondary users 52. For example, the primary user could control what is shown on the user interface for secondary users 52, or control the ergonomics of the secondary users 52 location (rooms) (dim lights, turn off phones, adjust volume of speakers, connect them to a common PA system, etc.). Similarly, secondary users 52 may have the ability to also control certain functions of the system. Although a given client might be able to control certain functions, other functions may be outside of the control of any given client. For example, the primary and secondary users 52 may be simultaneously viewing a session which the primary user is leading. A secondary user can open a new window on her client, access the session that they are viewing, and go back in time to review the session some amount of time earlier without the knowledge of the other parties and without interfering with what the other parties are seeing.

The primary and secondary users 52 may have appliances, such as video and audio to facilitate their interaction and collaboration. For example, each might be assigned their own pen color. Alternatively, only some of them may have the right to add to a session.

The primary and secondary users 52 may also provide designations to control who can participate in the meeting (e.g., limit attendee, make it open, allow Jane and John to exchange messages that Bob and Mary can't see/hear). These various users 52 can also assign rights to different portions of the session. For example, certain slides may be tagged confidential and be accessible by fewer users 52. Alternatively, the list of who can view a given session may be controlled.

The session service acts as a router for all other services. The session service participates in the session startup protocol with the bartender service and in the meeting protocol with the meeting service. The session service is responsible for managing the ETS 12 user interface in terms of audio feedback, control regions and any other capabilities that may be present at the network interface device 20. The current state of the ETS 12 and any updates are managed by a session service. This means that as soon as a bartender begins communicating with a new ETS 12, the bartender service must find a session service which will manage the data from the new ETS 12. Data from services such as the bartender and meeting services is broadcast to registered listeners using the session service. All services are able to discover and contact the session service and register themselves as sources, listeners or both.

The archive service 44 provides the ability to browse data saved by a single user or meeting service. In one (1) embodiment, the archive service automatically stores data from sessions or meetings. In another embodiment, the users 52 can save the data from the session. Users 52 with the correct permissions are allowed to download and view the data. In one (1) embodiment, modification is not permitted. Flexibility can be given to allow the primary user (Bob) to save a version with no one else's comments. Alternatively, one secondary user might save a session with only her comments. While another secondary user might save a version of the session with only written comments. Meanwhile, still another secondary user might save a version of the session with all comments. It is possible for different rights to be assigned to each saved version (e.g., who can view that version). As can be seen from the Archive Service 44, centralizing the transmission of a session over a network 18 allows people a great deal of flexibility regarding how a given session can be saved and modified. This level of collaboration is not as facile over a non-distributed system of hosting a session. Users 52 are able to browse stored sessions. These sessions can be sorted by date and time, user name, location of the electronic transcription device 12 and any comments that have been associated with the stored archive. Users 52 only see the stored sessions that they have access to. Users 52 are also given the ability to change security permissions at any time to allow after-the-fact access to certain archives for other users 52. Users 52 who have the appropriate security access to the data can manipulate the data such as by renaming, moving, deleting and adding comments to the data. Finally, users 52 can import/export files. In the preferred embodiment, the users 52 can only import/export files in the same format as the format of the data files created by the electronic transcription system 12.

Figure 7:
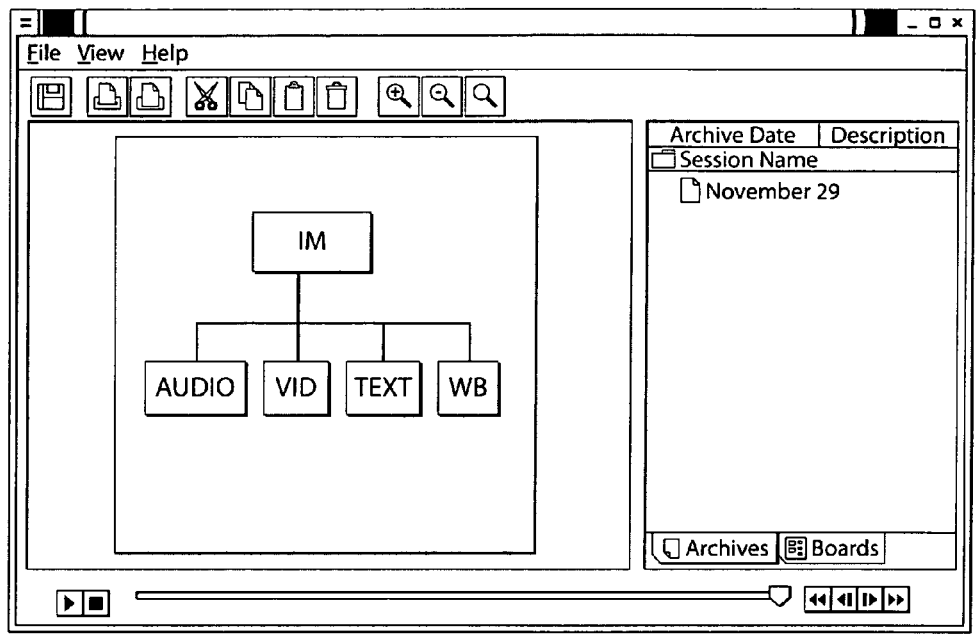
FIG. 7 shows the user interface screen for the archive service.
Figure 8A:
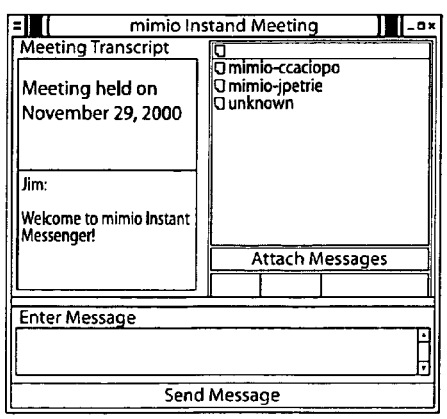
FIG. 8A shows the meeting service user interface with the chat facility on the left and the list of ETS 12 on the right.
Figure 8B:
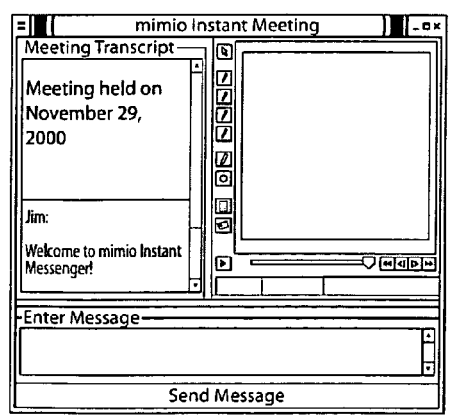
FIG. 8B shows the meeting service user interface with the chat facility on the left and the ETS 12 session on the right.
Figure 9:
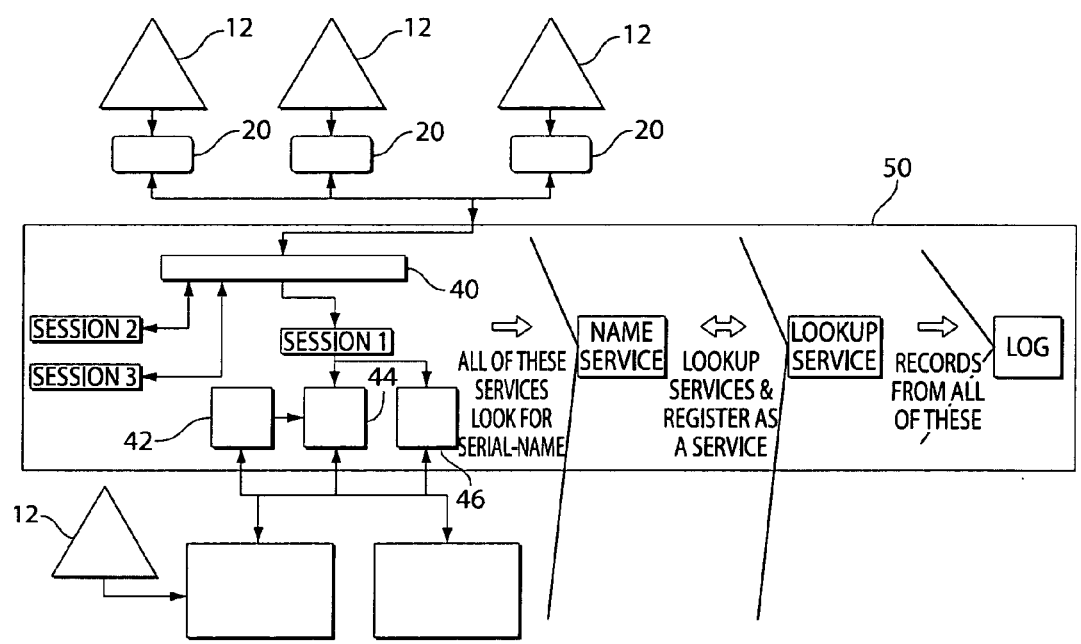
FIG. 9 shows the architecture of the system of the present invention.

The meeting service manages the data controls and behavior of an online meeting. It interacts with one or more session services via the meeting protocol (FIG. 7). The meeting service allows users 52 to hold interactive meetings over the network 18 using one or more ETS 12. Preferably, the ETS 12 and users 52 are able to contribute to a shared meeting. The degree of contribution can be different for different ETS's 12 and users 52. The meeting service user interface can provide a chat facility and allow user input as well as enabling a user to view of current ETS 12 session (FIGS. 8A and 8B). A list of ETS 12 can be provided on the controls tab of the meeting service user interface. The user can connect to a specific ETS 12 or meeting.

Print Service 46 refers to the process whereby an individual party or user (Bob, Mary, Jane, or John) could cause printing to be performed at local printer 54 for one or more of the primary or secondary users 52. It is noted that since the primary and secondary users 52 are each separately connected to the network 18, while some functions may be controlled centrally, other functions may be controlled locally. For example, with regard to the Print Service 46, each of the users 52 can independently designate where a print job is sent to their given client. This individual configuration of clients can be extended to a wide variety of functions (contrast, display size, volume, etc). In one (1) embodiment the network interface device 20 can be used to connect the ETS 12 to the network 18 and allow the ETS 12 to print the current status of a session directly from the controls of the ETS 12 directly to a designated network printer 54.

In Use

A primary user connects an ETS 12 to a network interface device 20 and connects the network interface device 20 to a network 18. In one (1) embodiment, the network interface device 20 contacts the DHCP server and obtains an IP address. In another embodiment, the network 18 does not have a DHCP server and the network interface device 20 contains software which enables the network interface device 20 to accept an IP address from the user. Once the network interface device 20 has an IP address, the network interface device 20 will automatically discover the server and initially connect to the appropriate services. The network interface device 20 engages in the bootstrap protocol and becomes connected to the bartender service. The bartender service engages in discovery and requests a session service. In one (1) embodiment using the MIMIO™, the user presses the new session button on the MIMIO™ which prompts the bartender service to seek a session service. The session service sends an event to the server indicating the start of a session. Receipt of the event by the server prompts the archive service to engage in discovery and request the session service which sent the event. The archive service will then store the date from the session in the archive database. If another user or a plurality of users 52 wants to access an ongoing session, the user engages a meeting service which engages in discovery and requests the session service. The meeting service allows one or more users 52 to interact in realtime with the session. To access a session which is stored in an archive database, the user engages the archive service to access the archive database.

A remote user or users 52 can also open a session by using the meeting service to engage a session service for access to the session. The users 52 are then able to access the session and access each other through the session. The meeting service allows for real-time interaction between multiple users 52 on the network 18 through the session.

In particular, audio feedback can be provided when a user begins a session, a user ends a session, the user presses a button, there is error condition, a reminder condition occurs, a server event occurs or the user interacts with the ETS 12. The system can also include software which allows web-based access to the archive service.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the foregoing description be only illustrative of the present invention and that the present invention be limited only by the hereinafter appended claims.

We claim:

1. A system for integrating one or more electronic transcription systems having sessions providing data and a network, wherein said transcription systems record processible stroke data corresponding to writing and is a transcription system selected from the group of active surface transcription and passive surface transcription; the system comprising:

(a) one or more network interface devices each operably connected to the electronic transcription system which is integrated into the network which registers the electronic transcription system with the network, wherein each device includes hardware that has a first connection to connect the network interface device to the electronic transcription system, a second connection to connect the device to the network, and software code to enable the network interface device to convert data from the session with the electronic transcription system into data suitable for transmission over the network;

(b) one or more services to allow access to the data;

(c) one or more server systems, each server system operably connected to the network, wherein each of the server systems implements one or more of the services to enable access to the data from the one or more electronic transcription systems; and (d) a user device configured to enable a remote user access to the data from the session of the one or more electronic transcription systems connected to the network.

2. The system of claim 1, wherein the remote user to the one or more electronic transcription systems is provided real-time, two-way interactive access to the data from one or more sessions of the one or more electronic transcription systems connected to the network.

3. The system of claim 1, wherein a bartender service and a service session is provided which manages interactions with each session in the system including providing a network connection between the network interface device and a session service for the session and participating in a discovery protocol to find the session service and register the device with the session service.

4. The system of claim 1, wherein a session service is provided which acts as a router for other services in the system wherein the other services are able to discover and contact the session service and register itself as a source, a listener, or both.

5. The system of claim 1, wherein an archive service is provided wherein the user uses the archive service to access an archive of data that has been stored on the network.

6. The system of claim 1, wherein an archive service is provided which automatically stores data from the sessions.

7. The system of claim 1, wherein a meeting service is provided which enables users to access one or more sessions and to modify the data from the sessions over the network.

8. The system of claim 7, wherein a meeting service is provided which allows two or more remote users to communicate in real time using the network while viewing a session.

9. The system of claim 1, wherein the service with a web user interface provides web-based access to the services.

10. The system of claim 1, wherein a print service is provided which enables the data of the session to be printed on a printer located on the network.

11. The system of claim 1, wherein the network interface device includes software which allows the network interface device to automatically obtain an IP address for the electronic transcription system from the server system.

12. The system of claim 1, wherein the network interface device includes software which allows the network interface device to receive the IP address from the user.

13. The system of claim 1, wherein the network interface device serves as a dynamic host configuration protocol (DHCP) server.

14. The system of claim 1, wherein there are at least two users using the meeting service, wherein the two or more users are able to access one of the sessions simultaneously and modify the data from the session.

15. The system of claim 1, wherein the one or more of the server systems is located in the network interface device.

16. The system of claim 1, wherein the one or more of the server systems is located in the user computer.

17. The system of claim 1, wherein the one or more of the server systems is located on a device that is not the network interface device or the user computer.

18. The system of claim 1, wherein the connection of the network interface device to the network is wireless.

19. The system of claim 1, wherein the connection of the network interface device to the electronic transcription system is wireless.

20. The system of claim 1, wherein the network interface device includes configuration control software which is used to configure and control the server.

21. The system of claim 1, wherein the network interface device is an integral part of the electronic transcription system.

22. A method for integrating one or more electronic transcription systems having sessions providing data and network, wherein said transcription systems record processible stroke data corresponding to writing and is a transcription system selected from the group of active surface transcription and passive surface transcription, comprising the steps of:
(a) providing one or more of network interface devices each operably connected to the electronic transcription system which is integrated into the network, which registers the electronic transcription system with the network, wherein each device includes hardware that has a first connection to connect the network interface device to the electronic transcription system, a second connection to connect the device to the network, and software code to enable the network interface device to convert data from the electronic transcription system into data suitable for transmission over the network;
(b) providing one or more services for accessing the data;
(c) providing one or more server systems, each server system operably connected to the network, wherein each of the server systems implements one or more services to enable access to the data from one or more electronic transcription system;
(d) providing a user device configured to enable the remote user access to the data from the session of the one or more electronic transcription systems connected to the network;
(e) connecting the electronic transcription system to the network interface device;
(f) connecting the network interface device to the server, wherein the network interface device obtains an IP address for the electronic transcription device from the server;
(g) beginning a session using the electronic transcription system, wherein the network interface device accesses a service;
(h) transferring data from the electronic transcription system through the network interface device to the server wherein a service automatically stores the data on the network; and
(j) accessing the data from a remote location on the network.

23. The method of claim 22, wherein the remote user accesses the data in real-time from one or more sessions of the one or more electronic transcription systems connected to the network.

24. The method of claim 22, wherein the remote user accesses the meeting service to obtain real-time interactive access to the data.

25. The method of claim 22, wherein a bartender service and a session service is provided and wherein the network interface device accesses the bartender service which manages interactions with each session and provides a network connection between the network interface device and the session service for the session and participates in a discovery protocol to find the session service and register the electronic transcription service with the session service.

26. The method of claim 22, wherein a session service is provided and wherein a user at the remote location accesses the session service to register itself as a source, a listener, or both and to access other services in the system.

27. The method of claim 22, further including an archive service which a user at the remote location uses to provide the user access data from the sessions that has been stored on the network.

28. The method of claim 22, further including an archive service which automatically stores data from the sessions.

29. The method of claim 22, further including a meeting service which a user at the remote location uses to access one or more sessions and modify the data from the sessions over the network.

30. The method of claim 29, wherein users at two or more remote locations use the meeting service to communicate in real time using the network while viewing a session.

31. The method of claim 22, further including the service with a Web user interface which a user at the remote location uses for web-based access to the data stored on the network.

32. The method of claim 22, further including a print service which a user at the electronic transcription system uses to print data of the session using a printer located on the network.

33. The method of claim 22, wherein the network interface device is configured to operably connect with an electronic transcription system which is an active surface transcription system and wherein the network interface device converts data from the active surface transcription system for transfer to the network.

34. The method of claim 22, wherein the network interface device is configured to operably connect with an electronic transcription system which is a passive surface transcription system and wherein the network interface device converts data from the passive surface transcription system for transfer to the network.

35. The method of claim 22, wherein there are at least two users using the meeting service, wherein the two or more users access one of the sessions simultaneously and modify the data from the session.

36. The system of claim 22, wherein the network interface device includes software which the network interface device uses to automatically obtain an IP address for the electronic transcription system from the server system.

37. The system of claim 22, wherein the network interface device includes software which the network interface device uses to receive the IP address from the user.

38. The system of claim 22, wherein the network interface device acts as a dynamic host configuration protocol (DHCP) server.

39. The system of claim 22, wherein the one or more of the server systems is located in the network interface device to provide the server systems.

40. The system of claim 22, wherein the one or more of the server systems is located in the user computer to provide the server systems.

41. The method of claims 22, wherein the one or more of the server systems is located on a device that is not the network interface device or the user computer to provide the server systems.

42. The system of claim 22, wherein the network interface device uses a wireless connection to the network.

43. The system of claim 22, wherein the network interface device uses a wireless connection to the electronic transcription system.

44. The system of claim 22, wherein the network interface device includes configuration control software which it uses to configure and control the server.

45. The system of claim 22, wherein the network interface device acts an integral part of the electronic transcription system.

* * * * *